(12) United States Patent
Kelly et al.

(10) Patent No.: US 7,550,171 B2
(45) Date of Patent: Jun. 23, 2009

(54) PROCESS AND EQUIPMENT FOR MAKING SIMULATED OLIVE PRODUCTS BY COEXTRUSION, AND OBTAINABLE PRODUCT

(75) Inventors: Thomas Reid Kelly, Northants (GB); Bryan Edwin Barwick, Northants (GB); Vijay Arjun Sawant, Northants (GB)

(73) Assignee: FMC Corporation, Philadelphia, PA (US)

( * ) Notice: Subject to any disclaimer, the term of this patent is extended or adjusted under 35 U.S.C. 154(b) by 694 days.

(21) Appl. No.: 10/497,197

(22) PCT Filed: Nov. 28, 2002

(86) PCT No.: PCT/GB02/05358

§ 371 (c)(1), (2), (4) Date: Dec. 27, 2004

(87) PCT Pub. No.: WO03/047365

PCT Pub. Date: Jun. 12, 2003

(65) Prior Publication Data

US 2005/0255212 A1 Nov. 17, 2005

(30) Foreign Application Priority Data

Nov. 29, 2001 (GB) ................................ 0128649.1

(51) Int. Cl.
*A23L 1/0524* (2006.01)
*A23L 1/0532* (2006.01)
*A23P 1/12* (2006.01)

(52) U.S. Cl. ...................... 426/615; 426/516; 426/517; 426/518; 426/573; 426/638

(58) Field of Classification Search ................. 426/615, 426/638, 518, 516, 517, 573
See application file for complete search history.

(56) References Cited

U.S. PATENT DOCUMENTS 4,362,748 A 12/1982 Cox (Continued)

FOREIGN PATENT DOCUMENTS

FR 2819994 A 8/2002

(Continued)

*Primary Examiner*—Helen F Pratt
(74) *Attorney, Agent, or Firm*—Stout, Uxa, Buyan & Mullins, LLP; Frank J. Uxa

(57) ABSTRACT

Our invention is concerned with a process and equipment and the resulting product. The process and equipment produce simulated cylindrical olive products with a central core. An aqueous alginate or low-methoxy pectate sol containing dispersed olive flesh is co-extruded through a nozzle with a stream of an aqueous solution containing dissolved calcium ions flowing through an inner core of the nozzle at not more than +/−30° to the horizontal into a bath of an aqueous solution containing dissolved calcium ions. The sol of alginate or low-methoxy pectate gels by diffusion of the calcium ions from the co-extruded stream containing dissolved calcium ions and from the aqueous solution containing dissolved calcium ions in the bath. A cylindrical tube of gelled alginate or low-methoxy pectate containing pulped olive is formed with a hollow core. Preferably the sol contains a calcium salt in addition to the dispersed olive flesh which calcium salt has insufficient free ions to gel the sol but in acidic conditions is soluble and so then can gel the sol. A plurality of nozzles can advantageously be used. The density of the solution in the bath is preferably greater than the density of the extruded sol.

18 Claims, 2 Drawing Sheets

U.S. PATENT DOCUMENTS

Figure 1:
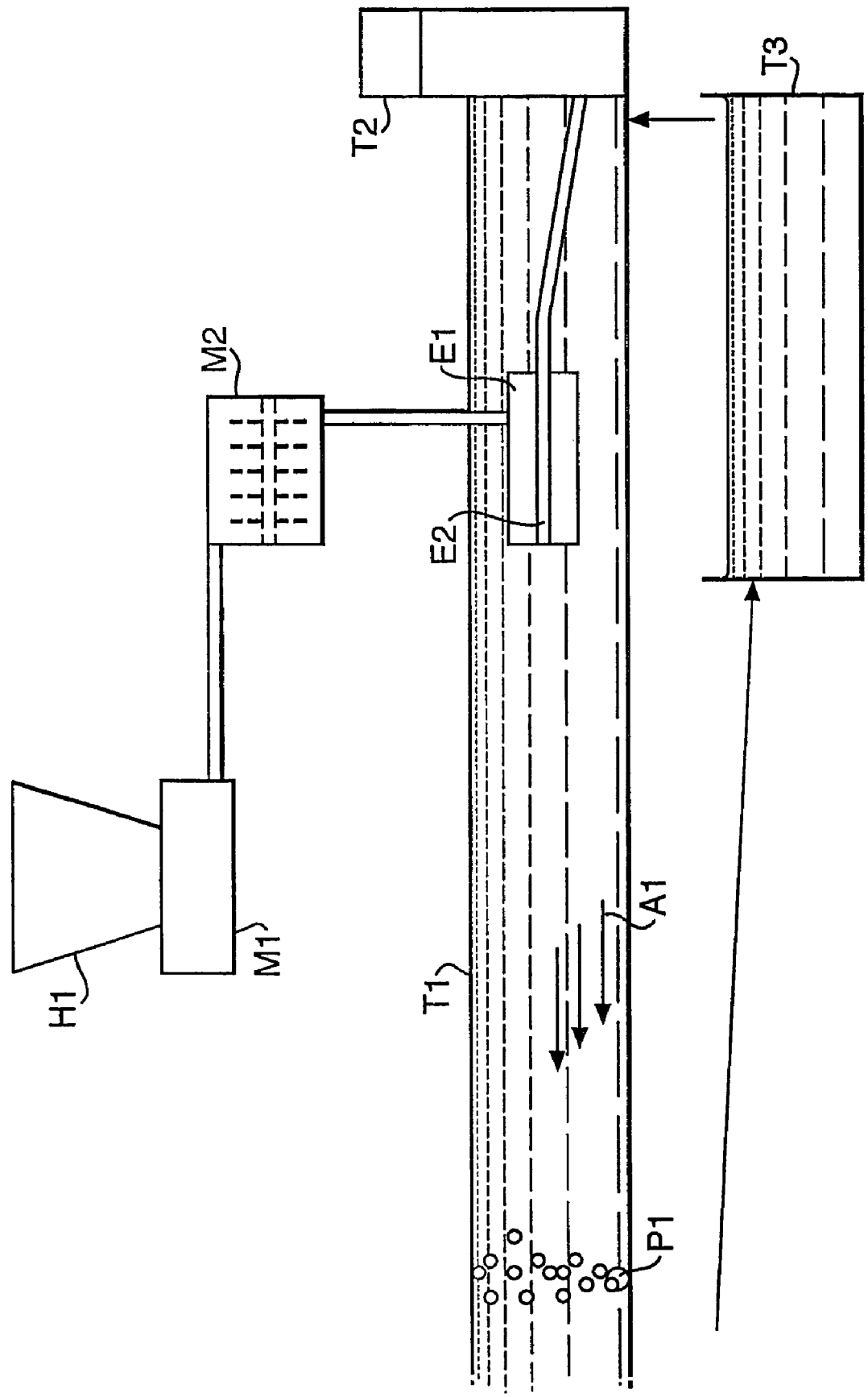

| | | | |
|---|---|---|---|
| 4,695,466 A | | 9/1987 | Morishita et al. |
| 5,094,871 A | * | 3/1992 | Heath .................. 426/573 |
| 5,783,241 A | | 7/1998 | Bocabeille et al. |
| 6,242,094 B1 | | 6/2001 | Piesczek |

FOREIGN PATENT DOCUMENTS

| | | |
|---|---|---|
| GB | 1059595 | 2/1967 |
| GB | 1305826 | 2/1973 |
| GB | 1346346 | 2/1974 |
| GB | 1366534 | 9/1974 |
| GB | 1456198 | 11/1976 |
| GB | 2013960 A | 8/1979 |
| JP | 1085059 A | 3/1989 |
| NL | 9201307 | 2/1994 |

* cited by examiner

PROCESS AND EQUIPMENT FOR MAKING SIMULATED OLIVE PRODUCTS BY COEXTRUSION, AND OBTAINABLE PRODUCT

The present invention relates to a process to prepare simulated olive products, equipment usable in such a process and related products.

It has long been recognised that processes transforming culled and otherwise wasted olives and the like to prepare simulated olive products would be useful. For instance such simulated olive products could help meet the great need for olive slices for products such as pizzas and the need for olive products e.g. as snacks.

U.S. Pat. No. 5,094,871 to Heath sets out the background showing the demand for such processes, related equipment, and products and also the general technology used in the olive industry e.g. for "curing" olives and preparing "black ripe" style olives. U.S. Pat. No. 5,094,871 then sets out Heath's invention. This involves either a) mixing a stream of olive flesh containing an alginate gellable by calcium ions and a chelating agent such as hexametaphosphate in a high shear mixer with another stream of olive flesh containing a calcium salt such as calcium sulphate and extruding the mixture obtained down a tube or into moulds to allow gelation to come to completion or b) heating olive flesh containing a heat activated alginate and then cooling the mixture whilst it is extruded down a tube or into moulds to allow gelation to come to completion. In each case the mixture also contains other ingredients to give appropriate characteristics to the product. U.S. Pat. No. 5,094,871 describes co-extrusion of such olive streams with other materials and mentions that, when an extruder barrel is used, a small diameter concentric rod can be provided to give the extruded product a centre hole, which is usually desired.

The use of alginate as a gelling agent is long-established although the interaction between the various factors involved remains relatively poorly understood.

Another publication which proposes the use of alginate as a gelling agent in the preparation of simulated olive products is U.S. Pat. No. 5,783,241 to Bocabeille et al. In one of the processes proposed in U.S. Pat. No. 5,783,241 a mixture of alginate and olive flesh is extruded as a cylinder vertically upwards into a bath containing free calcium ions. The cylinder can be hollow i.e. when a ring-shaped die orifice is used.

Our invention provides an improved process and related equipment for preparing simulated olive products in cylindrical form with a hollow core and also improved such products.

In our process for preparing simulated olive products in cylindrical form with a hollow core
  an aqueous alginate or low-methoxy pectate sol containing dispersed olive flesh is co-extruded through a nozzle,
  with a stream of an aqueous solution containing dissolved calcium ions flowing through an inner core of the nozzle,
  at not more than +/−30° to the horizontal,
  into a bath of an aqueous solution containing dissolved calcium ions, to gel the alginate or low-methoxy pectate sol by diffusion of the calcium ions, from the co-extruded stream containing dissolved calcium ions and from the aqueous solution containing dissolved calcium ions in the bath,
  to form a cylindrical tube of gelled alginate or low-methoxy pectate containing pulped olive with a hollow core.

U.S. Pat. No. 5,094,871 refers to olive meat and olive pulp. We are using similar materials which we generically call "olive flesh" to distinguish them from stoned whole olives. The olive flesh can be particulate or pulped. Suitable olive flesh, for example, is that produced by brush screening of olives to leave the stones behind, the flesh achieved by brush-screening pitted olives and the flesh that can be removed from the stones after they have been cut out of whole olives.

Our process advantageously is especially adaptable to use with a plurality of nozzles, preferably at least four and particularly preferably at least ten. There is no upper limit in principle but practical considerations will usually limit the maximum to, say, twenty.

With such use of a plurality of nozzles we have found that it is important that the pressure at the extrusion point of the stream of the aqueous solution containing dissolved calcium ions through each inner core is both monitored and kept constant. We have found that the constant pressure is best achieved not by the use of pumps but by the use of a constant head of the aqueous solution containing dissolved calcium ions being extruded through the inner cores. Monitoring the pressure ensures that any blockages in the core liquid supply can be detected and located quickly. Sensors for each nozzle are preferably used. If a blockage occurs upstream of the sensor the pressure decreases, whereas a blockage occurring downstream of the sensor will cause the pressure to decrease.

Advantageously the alginate or low-methoxy pectate together with minor ingredients such as starch is dispersed in oil e.g. olive oil and the dispersion obtained is then mixed with dispersed olive flesh and water, preferably first in a low-shear bulk mixer and then in an in-line high-shear mixer. The high-shear mixer has to be such as to ensure hydration of the alginate without incorporating air into the system.

The aqueous solution containing dissolved calcium ions flows through the co-extruded tube of sol in part because of the head of the solution at the extrusion point but mainly because of another feature of our invention: recognition that adequate flow can be achieved by the pull of the extruding tube of sol on the co-extruded aqueous solution containing dissolved calcium ions.

In this connection it is advantageous to ensure that the aqueous solution containing calcium ions in the bath flows in the direction of extrusion of the sol and at a greater rate than the rate of extrusion of the sol as this gives a tow to the extruded sol. The flow of the aqueous solution in the bath is preferably constant. The rate of extrusion of the sol is related to the length of the bath as a residence time of at least about 3 minutes is required to obtain adequate stability of the cylindrical tube of gelled alginate or low-methoxy pectate containing the olive flesh with a hollow core. Our process has the advantage that short residence times can be achieved e.g. below 10 mins certainly below 20 mins. At an extrusion rate for the sol of 5 cm/sec the length of the bath has to be at least 9 m.

In our process the gelation of the extruded tube of alginate or low-methoxy pectate sol occurs by diffusion of calcium ions both from the bath of the aqueous solution containing dissolved calcium ions and also from the aqueous solution containing dissolved calcium ions inside the tube. Achievement of such diffusion setting in a process with other major advantages is the most important feature of our invention. Despite that we do not exclude use of supplementary non-diffusion setting e.g. setting using mixing of sol with sources of calcium ions or use of e.g. heat-setting systems. However use of diffusion setting as the sole or at least the predominate setting mechanism is much preferred.

To ensure consistent gelation of the sol it is of some importance that the extruded tube is subject to uniform contact with the aqueous solution containing dissolved calcium ions. However we have found that the process functions best when the density of the aqueous solution containing calcium ions in the bath is greater than the density of the extruded sol so that the extruded sol floats to the surface of the bath. We have found the effect of this on consistent gelation is relatively low but in any case can be countered by bubbling air or other inert gas up from below the extruded sol to ensure the extruded sol is kept moist with the aqueous solution containing dissolved calcium ions. This can be achieved by laying perforated tubes across the bottom of the bath at intervals down the length of the bath and at right angles to the flow of the aqueous solution in the bath and pumping e.g. air through these tubes.

Preferably the aqueous alginate or low-methoxy pectate sol containing dispersed olive flesh is co-extruded with the stream of an aqueous solution containing dissolved calcium ions at not more than +/−5° to the horizontal, particularly preferably horizontally into the bath of an aqueous solution containing dissolved calcium ions.

Horizontal or approximately horizontal co-extrusion of alginate or low-methoxy pectate sol and a solution containing calcium ions has an inherent disadvantage over vertical extrusion whether downwards of upwards, e.g. as proposed by Bocabeille et al in U.S. Pat. No. 5,783,241. This is that the extrudate falls or floats automatically from the extrusion nozzle. This can cause blocking of the nozzle and/or creation of distorted products. In this important context we have found that it is advantageous to start the extrusion of the aqueous alginate or low-methoxy pectate containing dispersed olive flesh onto a support surface above the level of the bath containing dissolved calcium ions and then lowering the surface into the bath whilst chopping off the ends of the extruded alginate sol at the same time beginning the co-extrusion of an aqueous solution containing dissolved calcium ions.

We have found that the exit of the inner nozzle is preferably chamfered so that the outer edge is further advanced than the inner edge. Surprisingly, this produces more even flow than with a non-chamfered inner nozzle or a chamfered inner nozzle with the inner edge further advanced than the outer edge. The cross-sections of the outer alginate sol and the inner aqueous solution are maintained more uniformly. A factor is that uneven contact of the aqueous solution of calcium chloride and the alginate sol is minimised. This use of an inner nozzle chamfered as stated is of advantage not only in connection with the present invention but also with other co-extrusions, particularly when the co-extruded systems interact together especially when physical change occurs because of the interaction. Of course the chamfered shape does not necessarily have to be produced by the physical process of chamfering as long as the shape is obtained.

Particularly when a plurality of nozzles is used it is advantageous to cut the tubes of gelled alginate or low-methoxy pectate containing olive flesh into segments at least 80 cm long, and preferably not longer than 100 cm, and subsequently to cut these segments to shorter lengths. This of course should only be done when they are adequately stable.

We have found that it is advantageous to accelerate the tubes in the direction of flow of the aqueous solution containing dissolved calcium ions in the bath as they are cut. We have found an advantageous way of achieving this: as they are cut the tubes are accelerated in the direction of flow of the aqueous solution containing dissolved calcium ions in the bath by the bath being shallower for at least 25 cm starting within 10 cm of the position at which the tubes are cut. The depth of the shallow must of course be greater than the depth of the tubes.

The tubes of alginate or low-methoxy pectate are still fragile at and after the stage at which they are cut. For instance getting them out of the bath of the aqueous solution containing calcium ions is a problem. We have found that this can be achieved using a tray with sufficient cross-supports to lift them out at right angles to the direction of extrusion.

Calcium chloride is the preferred source of calcium ions but other soluble calcium salts can be used e.g. calcium lactate and calcium acetate monohydrate.

Aqueous alginate sol is the preferred sol. Texture can be modified by using alginates from different seaweeds. Alginate is a linear polymer composed of mannuronic acid (M) and guluronic acid (G). The M:G ratio, which depends on the seaweed from which the alginate is prepared, influences the texture of resulting gels. Gels which are rich in guluronic acid (high G alginates e.g. above 50% guluronic residues) tend to produce stronger gels than those rich in mannuronic acid (high M alginates). For this reason high G alginates are preferred in our process. However high M alginates can be used in cases where they provide a more desirable texture.

When low-methoxy pectate is used it should preferably contain less than 30% methoxylated hydroxyl groups. "Low methoxy pectate" is a well-known term. The normal dividing line between low-methoxy pectate (or pectin) and high-methoxy pectate (or pectin) is 50% methoxylated hydroxyl groups. The alginate or low-methoxy pectate sol will usually be in the form of its sodium salt but potassium or ammonium salts can be used.

That our process uses diffusion setting has been emphasised. Diffusion setting minimises shear during gelation leading to more efficient use of ingredients and/or better, e.g. more consistent, products.

Preferably we use diffusion of calcium ions into alginate or low-methoxy pectate sol. But an alternative form of diffusion setting is the use of acid to diffuse into alginate or low-methoxy pectate sol containing a dispersed calcium salt insoluble in non-acid conditions but soluble in acid conditions. In that case the alginate or low-methoxy pectate sol contains, as well as dispersed olive flesh, also a calcium salt having insufficient free ions to gel the sol but which in acidic conditions is soluble and so would gel the sol; and the solution co-extruded through the inner nozzle is an aqueous solution of an acid, preferably a naturally occurring organic acid such as citric acid, malic acid, lactic acid, tartaric acid or fumaric acid. The pH of the alginate sol containing dispersed olive flesh can be as low as 5.5 without gelation of the sol occurring to too great an extent. Preferably it is kept in the range 5.5 to 6 before diffusion of acid occurs to lower the pH to initiate full gelation. Preferred sources of calcium ions are calcium compounds which are substantially insoluble under neutral conditions but which become soluble under acid conditions, such as $CaHPO_4$ and normal calcium tartrate.

Figure 2:
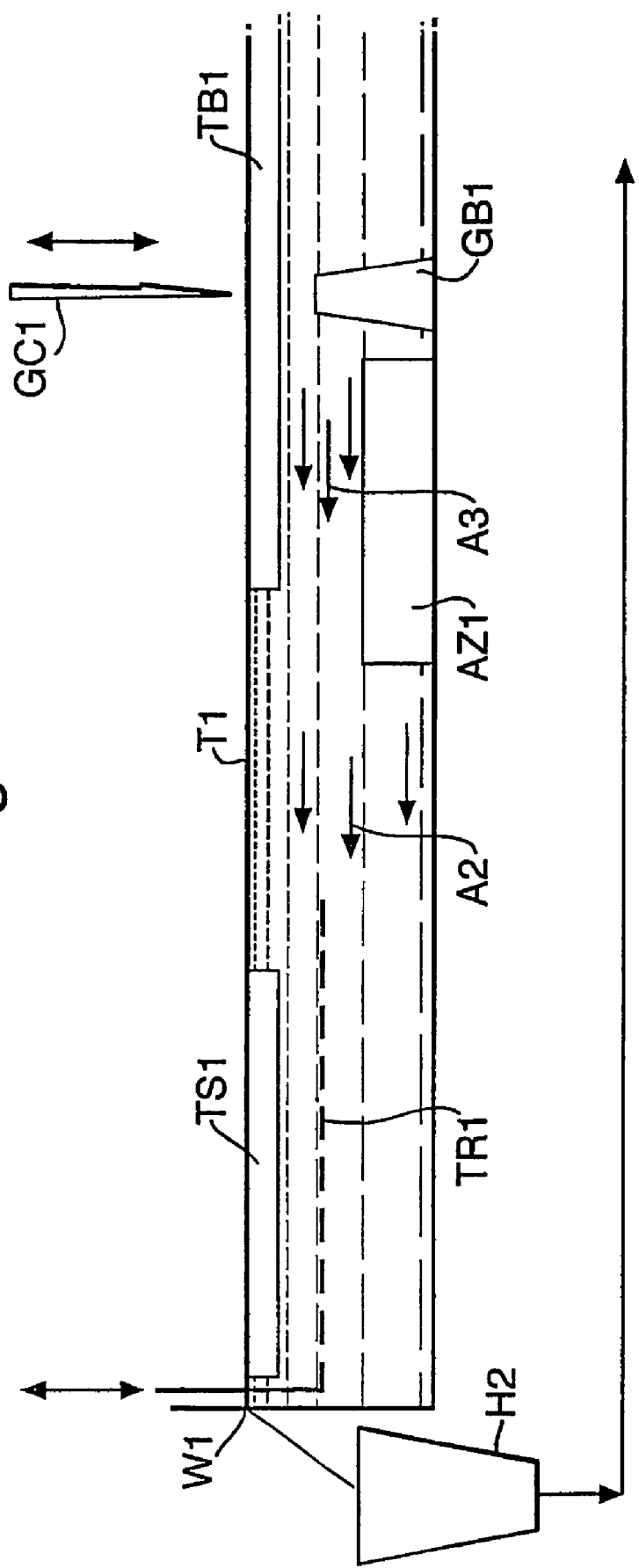

FIGS. 1 and 2 show a diagrammatic cross-section of equipment for use in the process according to the invention and of the process in operation.

Referring to FIG. 1, H1 is a hopper into which were poured alginate dispersed in olive oil and a mixture of pulped olives and water to give a mixture of olive flesh and aqueous alginate sol. More details of the ingredients are given below. The hopper feeds to an auger-fed pump, M1, which feeds an in-line high-shear mixer, M2, from which the finely dispersed mixture of olive flesh and aqueous alginate sol was fed to six extrusion nozzles spaced evenly apart horizontally, exemplified by extrusion nozzle, E1.

T1 is an elongated bath containing an aqueous 12% solution of calcium chloride. FIG. 1 shows only the initial 300 cm of tank, T1. The bath is about 20 cm wide. The finely dispersed mixture of olive flesh and aqueous alginate sol was extruded from the six extrusion nozzles, e.g. E1, in the direction of flow of the aqueous solution of calcium chloride indicated by the arrows, A1. The flow of the aqueous solution of calcium chloride was 10 cm/sec i.e. greater than the speed, 5.5 cm/sec at which the aqueous alginate sol containing dispersed olive flesh is extruded.

Aqueous 12% solution of calcium chloride, fed under constant pressure from supply tank, T2, was co-extruded through inner nozzles, e.g. E2, with the finely dispersed mixture of olive flesh and aqueous alginate sol through e.g. E1. Taps, not shown, were provided to control the flow of the solution of calcium chloride through the inner nozzles, E2. A constant head of 2 cm was maintained by a miniature ball-cock, not shown. Sensors, not shown, were situated at the exit points of the inner nozzles, e.g. E2, to measure the pressure at those separate points.

P1 is an example of perforated pipes laid at right angles along the length of tank, T1, and across its base. The pipes were spaced at intervals of about 200 cms along the bath. Air was passed through these pipes to produce bubbles which splashed the aqueous 12% solution of calcium chloride over the just floating tubes of finely dispersed olive flesh and aqueous alginate sol extruded through the nozzles, e.g. E1. The extruded tubes are shown in FIG. 2 rather than in FIG. 1. For each extruded tube, vertical rod guides, not shown, were fixed in the bath. There were six spaced evenly down the bath. The gap between the guide rods for the tubes was about 3 cm.

The overall formulation was as follows:

|  | % |
| --- | --- |
| Olive/water stream | |
| Pulped olive | 45.0 |
| Water | 45.0 |
| Sodium hexametaphosphate | 0.5 |
| (The sodium hexametaphosphate is present to chelate any calcium ions in the mixture of olives and water.) | |
| Alginate stream | |
| Liquid vegetable oil | 2.5 |
| Alginate (Manugel DPB*) | 2.0 |
| Starch (Instant Clearjel*) | 4.0 |
| Cellulose filler (Solka floc*) | 1.0 |
| | 100 |

*Manugel DPB is a trade mark of ISP Alginates and obtainable from ISP (Alginates) UK. Manugel DPB is a high G alginate.
*Instant Clearjel is a trade mark of National Starch.
*Solca Floc is a trade mark of International Fibre Corporation, Tonawanda, New York, USA.

Referring to FIG. 2: this shows only the final 300 cms of tank, T1. The total length of tank, T1, is 1400 cm. The just-floating tubes of finely dispersed olive flesh and aqueous alginate sol referred to above are shown in FIG. 2 as, e.g., TB1. The tubes moved in the direction of the arrows, A2. A guillotine with a cutting edge, GC1, and a block, GB1, cut the tubes, e.g. TB1, into segments, e.g. TS1 The base of the bath is raised, AZ1, to accelerate the flow of the aqueous solution of calcium chloride and hence the flow of the tubes, e.g. TB1, as shown by arrows A3. This acceleration helped keep the segments, e.g. TS1, apart. The normal depth of the bath is 10 cm. The depth where the base is raised is 2.5 cm so the velocity of the bath liquor in the shallow part was 4 times the velocity in the normal part.

A perforated tray, TR1, lifted the segments, e.g. TS1, from the bath and tipped them into a bath of water, not shown. The densities of the tubes and of the water were roughly equal. Tubes were removed for further processing from the lower levels of the bath of water on a "first-in, first-out basis"; in-coming tubes pressed tubes already in the bath of water down in the bath. The residence of the tubes in the bath of water was about ½ hour.

The aqueous 12% calcium chloride solution flowed over a weir, W1, at the end of the bath, T1, into a hopper, H2, from which it flowed to a supply tank, T3, shown in FIG. 1, from which it was supplied to the bath as shown in FIG. 1 and, although not shown, to the constant head supply tank, T2. The initial concentration of calcium chloride was restored, when required, by addition of calcium chloride to the supply tank, T3.

The process was run at ambient temperature, i.e. 20° C., for convenience.

Percentages are by weight unless otherwise indicated.

The invention claimed is:

1. A process for preparing simulated cylindrical olive products with a hollow central core comprising extruding an aqueous alginate sol or aqueous low-methoxy pectate sol containing dispersed olive flesh through a nozzle inclined at not more than +/−30° to the horizontal which nozzle contains an inner nozzle and simultaneously extruding a stream of an aqueous solution containing dissolved calcium ions through the inner core of the nozzle, into a bath of an aqueous solution containing dissolved calcium ions, and gelling the aqueous alginate sol or aqueous low-methoxy pectate sol by diffusion of the calcium ions from the co-extruded stream of the aqueous solution containing dissolved calcium ions and from the aqueous solution containing dissolved calcium ions in the bath, thereby forming a cylindrical tube of gelled alginate or gelled low-methoxy pectate containing dispersed olive flesh with a hollow core.

2. A process according to claim 1 in which a plurality of nozzles containing inner nozzles is used to produce a plurality of cylindrical tubes of gelled alginate or gelled low-methoxy pectate containing dispersed olive flesh with hollow cores.

3. A process according to claim 2 in which the density of the aqueous solution in the bath is greater than the density of the aqueous alginate sol or aqueous low-methoxy sol extruded from the nozzles.

4. A process according to claim 3 in which the aqueous solution in the bath flows in the direction of extrusion of the sol and at a greater rate than the rate of extrusion of the sol.

5. A process according to claim 1 in which the pressure of the simultaneously extruded stream of the aqueous solution containing dissolved calcium ions is monitored at the point it is extruded into the bath of the aqueous solution containing dissolved calcium ions.

6. A process according to claim 5 in which the pressure of the simultaneously extruded stream of the aqueous solution containing dissolved calcium ions is kept constant at the point it is extruded into the bath of the aqueous solution containing dissolved calcium ions.

7. A process according to claim 4 in which the tubes of gelled alginate or gelled low-methoxy pectate containing dispersed olive flesh are initially cut into segments which are at least 80 cm long and subsequently the segments which are at least 80 cm long are cut to lengths shorter than 80 cm.

8. A process according to claim 7 in which as the tubes are initially cut the tubes are accelerated in the direction of flow of the aqueous solution in the bath.

9. A process according to claim 8 in which as the tubes are initially cut the tubes are accelerated in the direction of flow of the aqueous solution in the bath by the bath being formed shallower for at least 25 cm starting within 10 cm downstream of where the tubes are cut.

10. A process according to claim 3 in which air or other inert gas is bubbled up from below the extruded aqueous alginate sol or the aqueous low-methoxy pectate sol thereby ensuring that the extruded aqueous alginate sol or aqueous low-methoxy pectate sol is kept moist with the aqueous solution containing dissolved calcium ions in the bath.

11. A process according to claim 1 in which the process is started by extruding the aqueous alginate sol or aqueous low-methoxy pectate sol containing dispersed olive flesh onto a support surface above the level of the aqueous solution containing dissolved calcium ions in the bath and then the support surface is lowered into the bath whilst chopping off the ends of the extruded aqueous alginate sol or aqueous low-methoxy pectate sol at the same time as starting simultaneously extruding the stream of the aqueous solution containing dissolved calcium ions through the inner core of the nozzle.

12. A process according to claim 1 in which the nozzle containing an inner nozzle is inclined at not more than +/−5° to the horizontal.

13. A process according to claim 12 in which the nozzle is horizontal.

14. A process according to claim 3 in which the cylindrical tubes of gelled alginate or gelled low-methoxy pectate containing dispersed olive flesh with hollow cores are removed from the bath using a tray with sufficient cross-supports to lift the tubes out of the bath at right angles to the direction of extrusion.

15. A process according to claim 1 in which the exit of the inner nozzle is chamfered so that the outer edge is further advanced than the inner edge.

16. A process according to claim 1 in which the stream of an aqueous solution containing calcium ions and the aqueous solution containing dissolved calcium ions in the bath are replaced by aqueous solutions containing dissolved acid and the aqueous alginate sol or aqueous low-methoxy pectate sol containing dispersed olive flesh also contains a dispersed insoluble calcium salt insoluble in non-acid conditions but soluble in acid conditions.

17. A process according to claim 1 in which the sol is an alginate sol.

18. A process according to claim 17 in which the alginate is a high G alginate.

* * * * *